United States Patent [19]
Oh

[11] Patent Number: 5,933,495
[45] Date of Patent: Aug. 3, 1999

[54] SUBBAND ACOUSTIC NOISE SUPPRESSION

[75] Inventor: Stephen S. Oh, Santa Clara, Calif.

[73] Assignee: Texas Instruments Incorporated, Dallas, Tex.

[21] Appl. No.: 08/797,019

[22] Filed: Feb. 7, 1997

[51] Int. Cl.$^6$ .................................................. H04M 1/00
[52] U.S. Cl. .................. 379/420; 379/406; 379/388; 370/289
[58] Field of Search .................. 379/406, 410, 379/411, 388, 420; 381/94.3; 370/286, 289, 290, 291

[56] References Cited

U.S. PATENT DOCUMENTS

| | | | |
|---|---|---|---|
| 4,852,175 | 7/1989 | Kates | 381/317 |
| 4,956,838 | 9/1990 | Gilloire et al. | 370/291 |
| 5,272,695 | 12/1993 | Makino et al. | 370/291 |
| 5,329,587 | 7/1994 | Morgan et al. | 379/410 |
| 5,517,435 | 5/1996 | Sugiyama | 364/724.19 |
| 5,544,250 | 8/1996 | Urbanski | 381/94.3 |
| 5,553,014 | 9/1996 | De Leon, II et al. | 364/724.19 |
| 5,587,998 | 12/1996 | Velardo, Jr. et al. | 370/289 |
| 5,668,927 | 9/1997 | Chan et al. | 704/240 |
| 5,680,393 | 10/1997 | Bourmeyster et al. | 370/286 |
| 5,687,229 | 11/1997 | Sih | 379/410 |
| 5,721,772 | 2/1998 | Haneda et al. | 379/406 |

*Primary Examiner*—Reinhard J. Eisenzopf
*Assistant Examiner*—Charles N. Appiah
*Attorney, Agent, or Firm*—William B. Kempler; Richard L. Donaldson

[57] ABSTRACT

A conditioning circuit for use with a microphone 224 placed near a loudspeaker 206 has microphone-in 225 and speaker-line 208 input terminals, an echo canceller circuit (212, 216, 220, 222), a noise-suppresser circuit 230, and a synthesis filter 234 coupling noise-suppresser circuit 230 to a microphone-out output terminal 236. Microphone-in 225 and speaker-line 108 input terminals respectively receive microphone and speaker signals. The echo canceller circuit is coupled between microphone-in 225 and speaker-line 108 input terminals and produces a subband reduced-echo microphone signal by (i) transforming the microphone signal into a subband microphone signal and the speaker signal into a filtered subband speaker signal, and (ii) subband subtracting the filtered subband speaker signal from the subband microphone signal. Noise-suppresser circuit 230 is coupled to the echo canceller circuit to produce a subband reduced-noise, reduced-echo microphone signal by subband noise suppression of the subband reduced-echo microphone signal. Synthesis filter 234 transforms the subband reduced-noise, reduced-echo microphone signal into a fullband reduced-noise, reduced-echo microphone signal. Because the subband signal is not restored to a fullband signal until after undergoing both echo cancellation and noise reduction, my system requires less processing power than systems that apply a synthesis filter between subband echo cancellation and noise reduction. This system is useful in hands-free telephones, especially hands-free cellular telephones used in automobiles. A circuit 538 for subbahd detection of near-end speech in the microphone signal can be provided so echo cancellation filter coefficients can be automatically frozen when near-end speech is detected.

21 Claims, 7 Drawing Sheets

SUBBAND ACOUSTIC NOISE SUPPRESSION

BACKGROUND OF THE INVENTION

In a full-duplex hands-free telephone or speaker-phone, sounds uttered by a first person calling into the speaker-phone and emanating from a speaker are picked up by the speaker-phone's microphone which is intended to pick up sounds uttered by a second person using the speaker-phone. Careful design of the hands-free telephone can prevent positive feedback which results in howling. A second form of feedback can be present in which the first speaker's words are transmitted back to him or her delayed in time at a reduced magnitude and often with distortion. This echo of one's own words is very distracting to most users and is normally controlled by an acoustic echo canceller circuit. If the hands-free telephone is a cellular telephone in an automobile, adaptive noise suppression is required because the signal-to-noise ratio is low and the characteristic of the noise varies with time.

Conventional hands-free digital cellular telephones address the acoustic echo cancellation and noise suppression problems as separate problems. Therefore, applying these solutions together may result in an inefficient system. For example, a fullband LMS algorithm disclosed in Sondhi, M. M. and Kellerman, W., Adaptive Echo Cancellafion for Speech Signals, Chapter 11 from *Advanced in Speech Signal Processing*, Ed. by S. Furui and M. M. Sondhi, Marcel Dekker, 1991, can be used to provide an effective and straight forward solution to echo cancellation. Recently, researchers have been using a subband acoustic echo canceller because this requires less computational complexity and provides faster convergence to the filter coefficients that produce optimum echo cancellation. The noise suppression algorithm is commonly based upon the spectral subtraction method. In the spectral subtraction method, for the noise only period, the noise spectrum is estimated using Fast Fourier Transform (FFT) or band pass filter banks. When the speech signal with noise comes in, the noise spectrum estimate is subtracted from the noise signal spectrum. The spectral subtraction method performs well for enhancing the signal-to-noise ratio but may create an artifact called "musical noise". A system using a smoothed spectrum for spectral subtraction to avoid production of musical noises is disclosed in U.S. patent application Ser. No. 08/1426,746 filed Apr. 19, 1995 by Allen V. McCree, assigned to Texas Instruments Incorporated and incorporated herein by reference.

FIG. 1 shows a prior art system in which the two algorithms, one for the acoustic echo cancellation and one for noise suppression are applied independent of each other. In the system of FIG. 1, acoustic echo cancellation is provided by block 110 and noise suppression is provided by block 134. The output signal on line 104 used to drive speaker 106 is provided by amplifier 102 from well known circuitry inside the hands-free telephone (not shown). The output signal on line 104 is also provided by line 108 to an analysis filter 112 which generates a subband signal on line 114 at the output of the analysis filter. The subband signal on line 114 is provided to adaptive filter 116. The output of adaptive filter 116 on line 118 is provided to summing amplifier 120 which also receives an input from analysis filter 122. Analysis filter 122 provides a subband signal from the input of microphone 124 which is the acoustic sounds emanating from the user also known as "near-end speech". The output of summation amplifier 120 on line 126 is provided to synthesis filter 130 which generates a fullband signal on line 132 and also via line 128 to the adaptive filter 116 to adjust the coefficients used by the filter. The coefficients of the adaptive filter 116 are adjusted to provide acoustic echo cancellation, as is well known in the art. Block 110 shows a subband acoustic echo cancellation system. If the system were implemented in the fullband domain, analysis filters 112 and 122 and synthesis filter 130 would be omitted.

The fullband reduced echo signal on line 132 is input to noise suppression circuit 134 at FFT generator 136. The output of FFT generator on line 138 is input to noise suppression circuit 140 which performs the spectral subtraction. The output of the spectral subtraction circuit on line 142 is fed into Inverse Fast Fourier Transform (IFFT) circuit 142 which produces the full band signal on line 146 as an output of the acoustic echo cancellation and noise suppression circuit 100.

The system of FIG. 1 has redundancies since the signal from the microphone is transformed to the subband domain for echo cancellation and to the frequency domain for noise suppression. The system can be implemented, for example, by a Texas Instruments TMS 320C50 DSP (Digital Signal Processor) and, if a full band acoustic echo suppression system is implemented, can require twenty to thirty MIPS of processing power. Accordingly, there is a need for a more efficient approach which can perform these functions using less processing power, and therefore at lower cost.

SUMMARY OF THE INVENTION

It is a general object of the present invention to provide a method, circuit and apparatus for suppressing noise.

Another object of the invention is to provide a method, circuit and apparatus for subband domain noise suppression in an acoustic echo cancellation and noise suppression system.

A further object of the invention is to provide a method, circuit and apparatus for an acoustic echo cancellation and noise suppression in a hands-free telephone.

Yet another object of the invention is to provide a method and apparatus for subband domain noise suppression in an acoustic echo cancellation and noise suppression system for a hands-free cellular telephone for an automobile.

These and other objects, advantages and features are achieved by an acoustic echo conditioning circuit for a microphone near a loudspeaker producing a first acoustic signal. The microphone receives a second acoustic signal, which includes a component of the first acoustic signal and generates a corresponding input signal. A subband domain acoustic echo cancellation circuit is coupled between the output signal source and the microphone for reducing the presence of the component of the first acoustic signal in the input signal and for generating a subband reducedho signal. A subband domain noise suppression circuit is coupled to receive the subband reduced-cho signal for reducing noise in the subband reducedecho signal and for generating a subband reduced-noise reduced-echo signal.

Another aspect of the invention includes a method of operating a hands-free telephone which has a loudspeaker coupled to an output signal source for generating a corresponding acoustic signal and a microphone for generating an input signal. The presence of the output signal in the input signal is reduced by subband domain acoustic echo cancellation for generating a subband reduced-echo signal. Noise in the subband reduced echo signal is suppressed by subband domain noise suppression for generating a subband reduced-noise reduced echo signal.

A further aspect of the invention comprises an acoustic echo cancellation and noise suppression apparatus having a loudspeaker coupled to an output signal source for generating a corresponding first acoustic signal. A microphone receives a second acoustic signal, which includes a component of the first acoustic signal and generates a corresponding input signal. A subband domain acoustic echo cancellation circuit is coupled between the output signal source and the microphone for reducing the presence of the component of the first acoustic signal in the input signal and for generating a subband reduced-echo signal. A subband domain noise suppression circuit is coupled to receive the subband reduced-echo signal for reducing noise in the subband reduced-cho signal and for generating a subband reduced-noise reduced-echo signal.

Yet another aspect of the invention includes apparatus for reducing noise in an audio frequency signal. An analysis filter is coupled to receive the audio frequency signal for generating a subband signal. A subband noise suppression circuit is coupled to receive the subband signal and comprises a circuit for estimating a current power $\rho_i(t)$; a circuit for updating a noise spectrum estimate $NS_i$; a circuit for computing noise suppression gain $G_i$; a circuit for adjusting for a minimum gain; and a circuit for scaling the reduced-cho signal with the computed gain.

A still further aspect of the invention is achieved by a method of reducing noise in an audio frequency signal. A subband signal is generated from the audio frequency signal. Noise in the subband signal is reduced by estimating current power $\rho_i(t)$, updating a noise spectrum estimate $NS_i$, computing noise suppression gain $G_i$, adjusting for a minimum gain, and scaling the reduced-cho signal with the computed gain.

DETAILED DESCRIPTION

Figure 1:
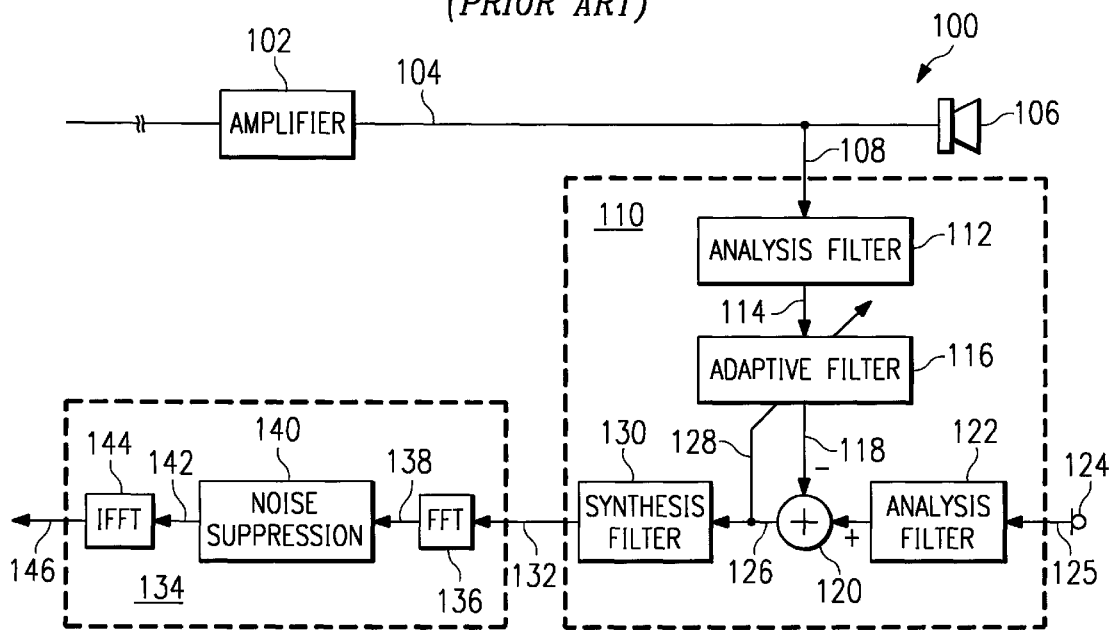
FIG. 1 is a block diagram of a conventional acoustic echo cancellation and noise suppression system.
Figure 2:
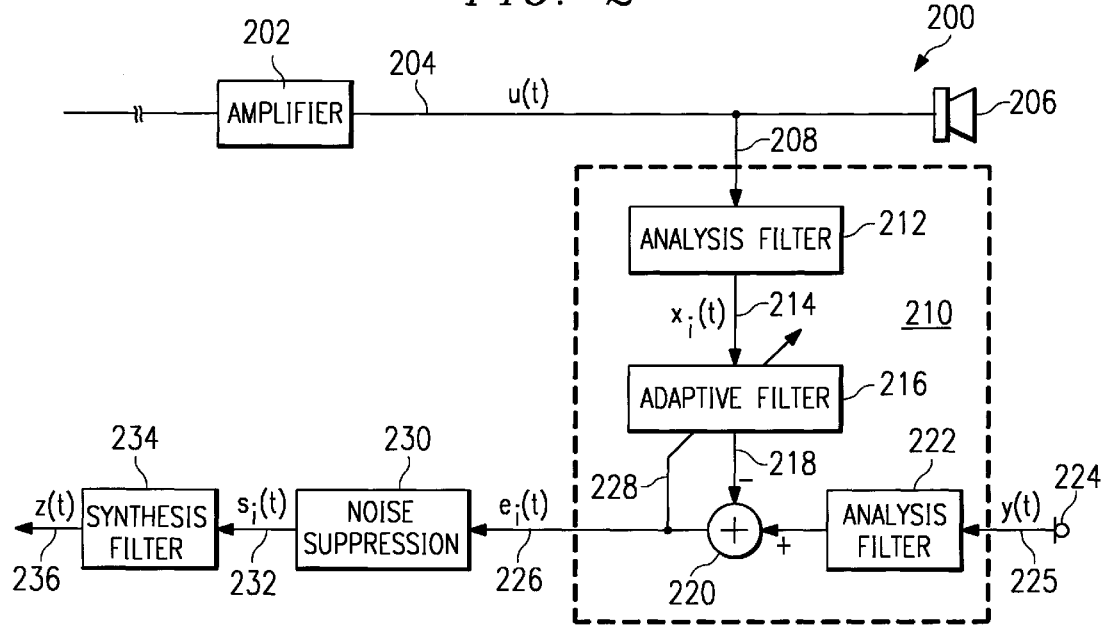
FIG. 2 is a block diagram of an acoustic echo cancellation and noise suppression system in accordance with one embodiment of my invention.

In the present invention, frequency domain processing is viewed as a special case of subband domain processing to produce a more efficient system in which both acoustic echo cancellation and noise suppression operations are performed in the same domain without going through a synthesis filter and Fast Fourier Transformation. Reducing the operations of synthesis filtering and Fast Fourier Transformation provides savings in processing power and computational complexity. Thus, the system proposed herein can require as little as seven MIPS of processing power, thus reducing the processing power required by two thirds to three quarters. The acoustic echo canceller and subband domain noise suppression system is shown generally as 200 in FIG. 2. Like elements have similar reference numerals to those in FIG. 1. Thus, the amplifier, speaker and microphone can be identical to those of FIG. 1. The acoustic echo canceller block 210 is essentially the same as the acoustic block 110 of FIG. 1, except that after echo cancellation by subbands the synthesis filter 130 for converting the subband signal to a fullband signal is omitted. Instead a synthesis filter 234 is applied to the output 232 of a noise suppression circuit 230 to provide fullband signal z(t) on line 236.

Figure 3:
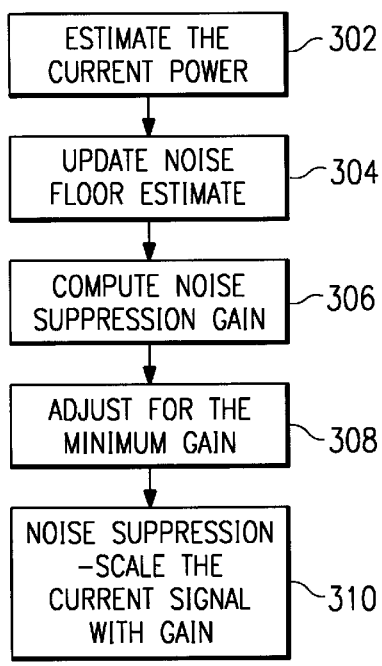
FIG. 3 is a flow diagram of the event sequences implemented by the noise suppression circuit of FIG. 2.

Noise suppression circuit 230 receives the output of the acoustic echo canceller as $e_i(t)$ for an i-th subband on line 226 and performs a subband noise suppression process 300 shown in FIG. 3. In a preferred embodiment, eight subbands are used and a smoothing operation is performed in the time domain using an IIR (Infinite Impulse Response) filter, a first order loop filter, on a power spectrum estimate for each subband to provide the time-domain smoothing without introducing system latency. The power spectrum at the i-th subband is estimated in block 302 using the equation:

$$\rho_i(t)=(1-\mu)\cdot\rho_i(t-1)+\mu|Xi(t)|^2 \quad \text{(Equation 1)}$$

where $\rho_i(t)$ is the estimate of the power spectrum at the $i^{th}$ subband, $|Xi(t)|^2$ is the current instantaneous power at the $i^{th}$ subband, and $\mu \ll 1$.

This provides an exponentially decreasing contribution for each of the previous time samples. For example:

$$\rho_i(10) = (1-\mu)\rho_i(9) + \mu|Xi(10)|^2$$
$$= (1-\mu)[(1-\mu)\rho_i(8) + \mu|Xi(9)|^2] + \mu|Xi(10)|^2$$
$$= (1-\mu)^2\rho_i(8) + \mu(1-\mu)|Xi(9)|^2 + \mu|Xi(10)|^2$$
$$= (1-\mu)^{10}\rho_i(0) + \mu(1-\mu)^9|Xi(1)|^2 + \mu(1-\mu)^8|Xi(2)|^2 \ldots +$$
$$\mu(1-\mu)|Xi(9)|^2 + \mu|Xi(10)|^2$$

For $\mu=0.1$ $\rho_i(0)=0$ $$\rho_i(10)=0.1|Xi(10)|^2 +0.09|Xi(9)|^2+0.08|Xi(8)|^2 \ldots +0$$

Then at block 304 the noise spectrum estimate $NS_i$ is updated. In block 306 this information is used to compute a noise suppression gain using:

$$G_i = \left(1 - \frac{NS_i}{k\rho_i}\right)^{\frac{1}{2}} \quad \text{(Equation 2)}$$

where k is a predetermined value to reduce the fluctuation of gain due to the power spectrum estimate and $NS_i$ is the noise spectrum estimate for the $i^{th}$ subband. The gain is then compared with a predetermined minimum gain and if it is less than the minimum gain, set equal to the minimum gain in block 308. It has been determined that if a noisy signal is suppressed too much this results in an audible artifact in the signal. Therefore, a minimum value is assigned to the gain which in effect clamps the noise suppression in each subband to avoid this audible artifact. Then in block 310 each echo-cancelled subband signal $e_i(t)$ is multiplied by its corresponding computed noise suppression gain $G_i$ to produce a scaled subband signal $s_i(t)$.

Figure 4:
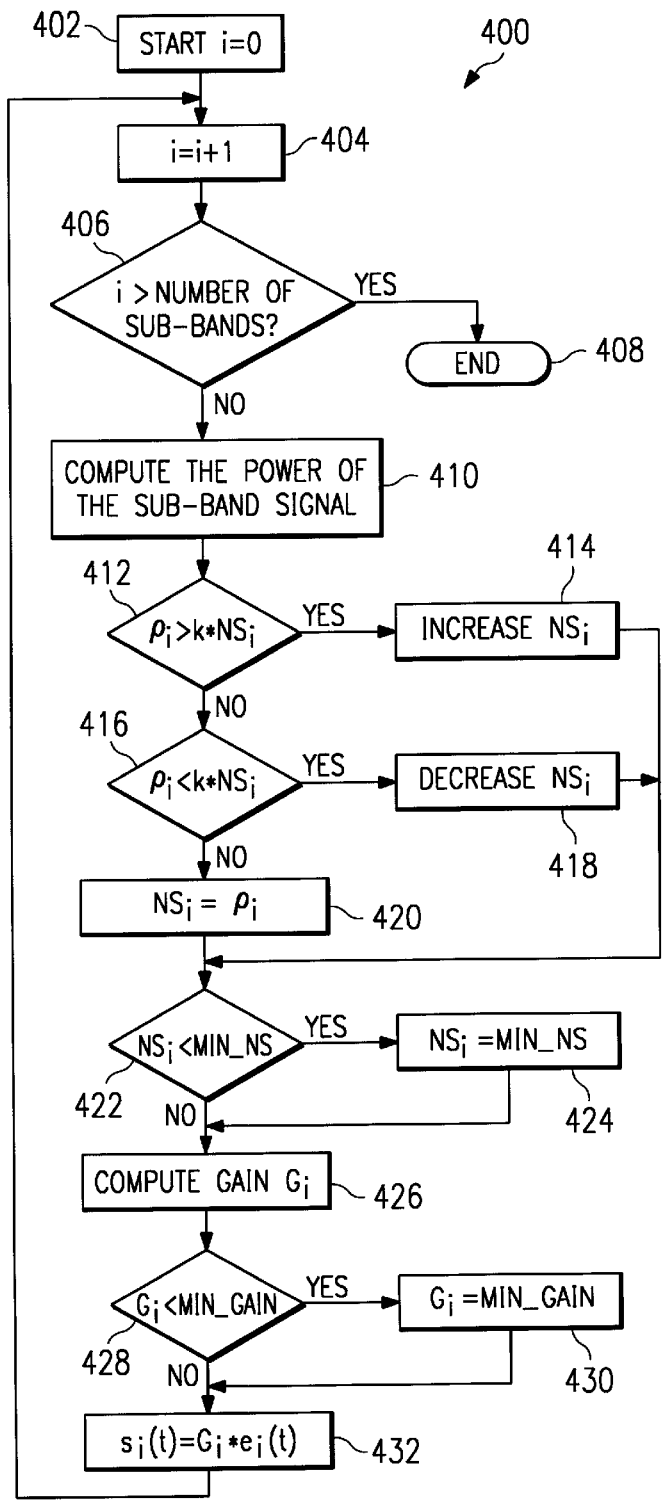
FIGS. 4 is a more detailed flow diagram of the event sequences in FIG. 3.

FIG. 4 shows a more detailed flow chart of the process of FIG. 3. Starting block 402 initializes the subband i to 0 and then proceeds to block 404 where the subband is incremented by 1. Control then passes to block 406 where the number of subbands is compared with the number of subbands to be used for the noise suppression operation, in this embodiment 8 subbands. Increasing the number of subbands reduces the computing power required, if the number of subbands is within reason. For example, 32 subbands can be used. But increasing the number of subbands has the disadvantage of requiring more memory. Eight subbands have been chosen here as a reasonable compromise. If the number of subbands has been exceeded the process terminates at block 408. Otherwise, control passes to block 410 in which an updated power spectrum estimate $\rho_i$ of the current subband signal is computed using equation 1. Control then passes to block 412 in which the power $\rho_i$ is compared against the predetermined constant k times the noise spectrum estimate $NS_i$ for the i-th subband. If $\rho_i$ exceeds this amount, the noise spectrum estimate $NS_i$ is increased. Otherwise, control passes to block 416 in which $\rho_i$ is compared to see if it is less than k times $NS_i$; if so, $NS_i$ is decreased. If it is not, control passes to block 420 in which $NS_i$ is set equal to $\rho_i$. Control from blocks 414, 418 and 420 proceeds to block 422 in which $NS_i$ is compared to see if it is less than the minimum noise spectrum estimate. If it is, then $NS_i$ is set equal to the minimum of the noise spectrum estimate in block 424. The output of block 424 or the NO output of block 422 pass control to block 426 in which the noise suppression gain $G_i$ is computed using equation 2. Control passes to block 428 in which gain $G_i$ is compared to see if it is less than the minimum gain. If it is, it is set equal to the minimum gain in block 430. The output of block 430 or the NO output of block 428 passes to control to block 432 in which the subband output $s_i(t)$ is set equal to the computed gain $G_i$ times the echo-cancelled subband signal $e_i(t)$. Control then returns to block 404 which increments the subband index i and the process repeated until all subbands have been gain-adjusted, after which the noise-suppression process terminates at block 408. This is followed by synthesis filter 234 which transforms the subband signals $s_i(t)$ into a fullband signal z(t) on line 236.

Figure 5:
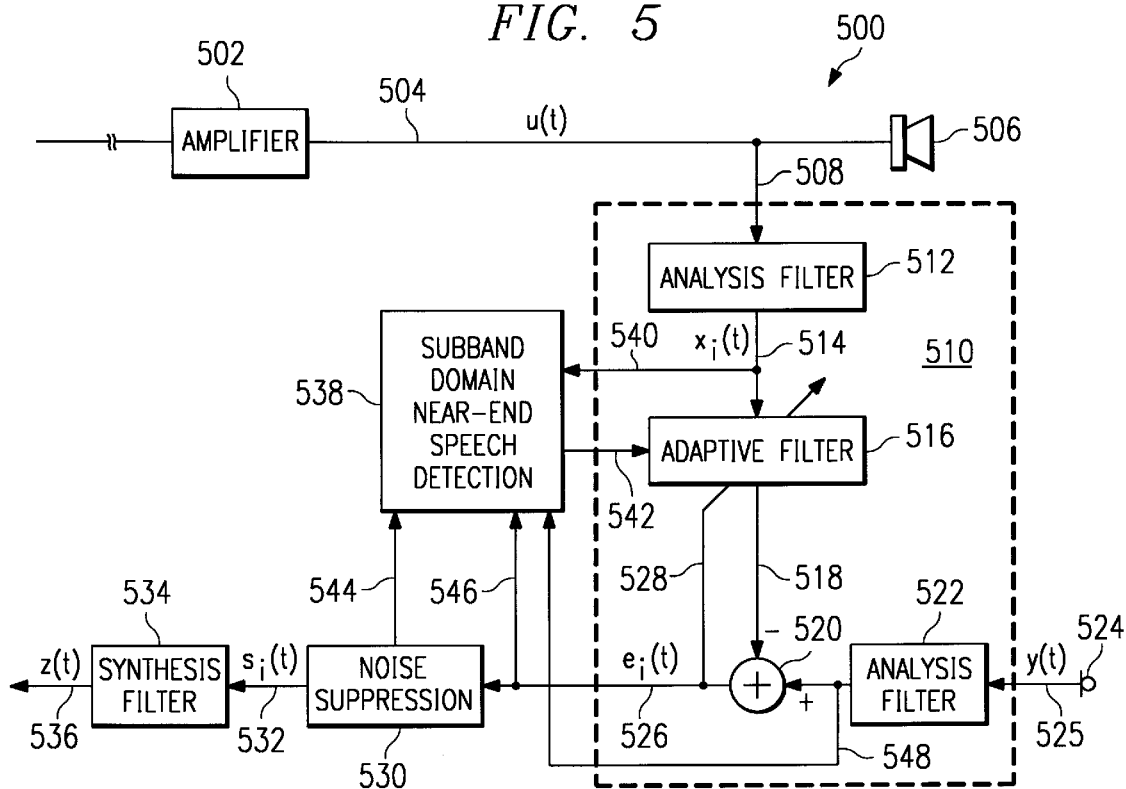
FIG. 5 is a block diagram of an acoustic echo cancellation and noise suppression system which includes subband domain near-end speech detection.

FIG. 5 shows a further embodiment of my invention generally shown as 500 in which near-end speech is detected in the subband domain. Near-end speech is speech from the local location of the hands-free telephone, that is, speech from the user of the telephone y(t) as compared with speech from the person from the other end of the telephone line or telephone link u(t). Once near-end speech is detected, the filter coefficients for the adaptive filter 516 are "frozen" to prevent the adaptive filter from becoming unstable. A fundamental assumption in acoustic echo cancellation techniques is the absence of near-end speech. Accordingly, when near-end speech is detected, updating of the adaptive filter coefficients is inhibited by logic circuits, for example, to prevent instability. The circuit in FIG. 5 is identical to that of FIG. 2 with the exception of the addition of block 538 which is the subband domain near-end speech detection circuit. Circuit 538 receives the subband signal $x_i(t)$ that is output from analysis filter 512 as well as the subband signal $e_i(t)$ which is the output of acoustic echo canceller block 510. Also received as input is an of output noise suppression circuit 530 on line 544 and the subband output of analysis filter 522 on line 548. A control line 542 sends a control signal to the adaptive filter 516 to "freeze" to coefficients thereof once near-end speech is detected.

Figure 6:
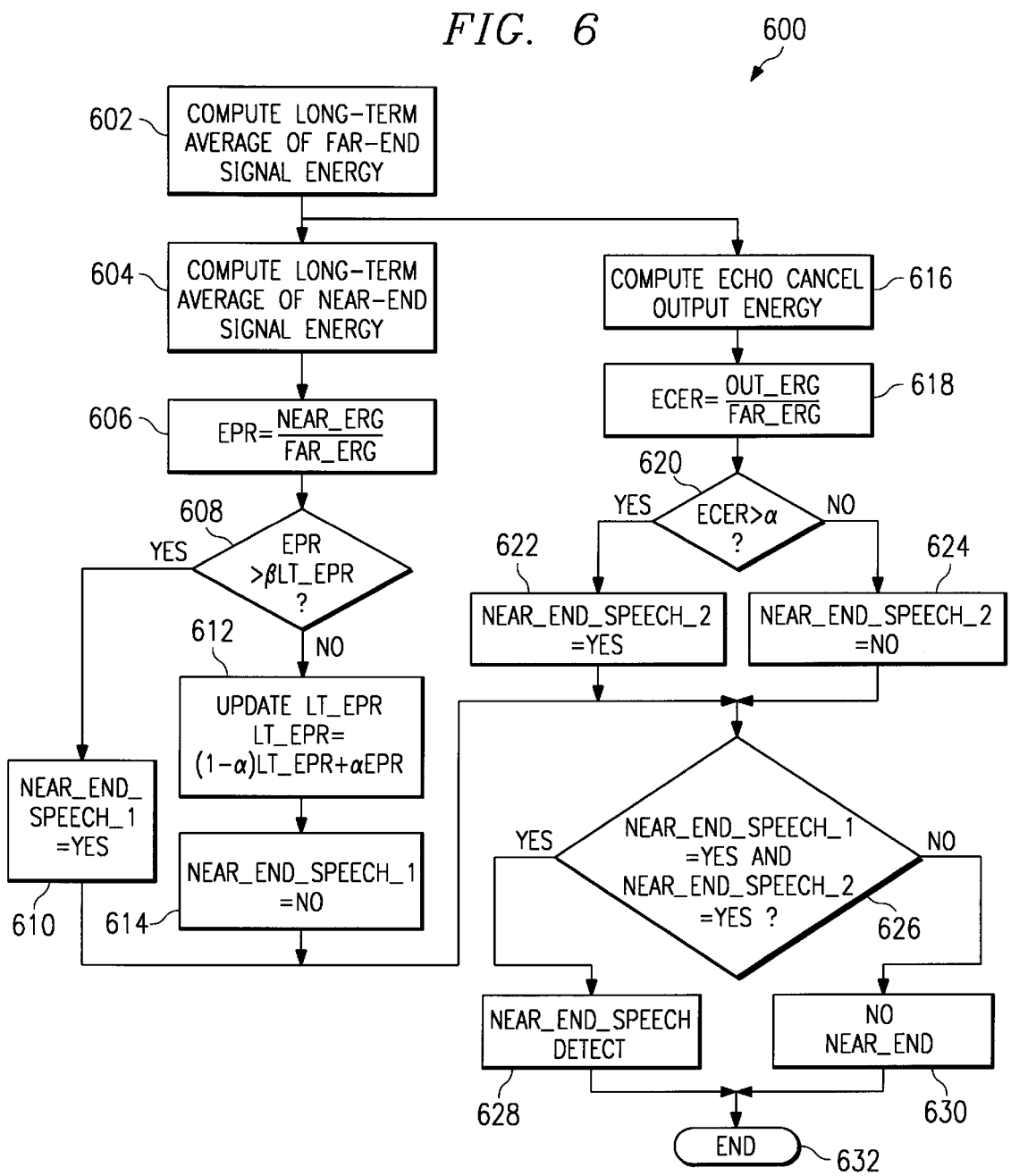
FIG. 6 is flow diagram of the event sequences implemented by the subband domain near-end speech detection of the embodiment of FIG. 5.

Circuit 538 implements the algorithm 600 of FIG. 6. An adaptive algorithm is used because the targeted environment is adverse (inside an automobile) and time varying. The algorithm uses two measures for detecting near-end speech, the echo path energy ratio and the echo canceller energy ratio. The term echo path energy ratio is defined as the energy ratio between the near-end speech signal, y(t), and the far-end speech signal, u(t), of FIG. 5. It has been determined that the noise components inside a car for highway driving are concentrated below 500 Hz, while speech signals are spread over entire frequency region. Thus, the echo path energy ratio can be used for detecting the near-end speech regardless of the noise condition if the ratio is computed based on frequency components beyond 500 Hz. This can be easily accomplished in the subband domain by selecting higher frequency bins. The echo canceller energy ratio is defined as the energy ratio between the acoustic echo cancel lation-noise suppression output $s_i(t)$ and the far-end speech signal u(t). The near-end speech detection algorithm tracks the echo path energy ratio by taking a long-term average and detects when the energy fluctuation is too large. The rationale behind this is that the energy of a human speech signal fluctuates much more quickly compared to any noise changes. For the echo canceller energy ratio, a fixed threshold value is used to detect the near-end speech signal. When both the acoustic echo canceller and noise suppression circuits work properly, the energy of s(t) should be less than the energy of u(t). Otherwise, either echo is not cancelled or noise is not suppressed enough. The fixed threshold value is determined empirically.

Algorithm 600 starts with block 602 in which the long-term average energy for the far-end signal u(t) is computed. Control then passes to block 604 in which the long-term average energy of the near-end signal y(t) is computed. Control passes to block 606 in which the echo path energy ratio (EPR) is determined as the ratio between the near-end speech signal to the far-end speech signal. Control then passes to block 608 in which the EPR is compared to see if it is greater than $\beta LT_{13}$ EPR. $\beta$ is an empirically derived constant and LT_EPR is the long-term average for EPR which is computed in block 612. For the first pass, LT_EPR is set equal to EPR from block 606. If EPR is greater than $\beta$LT_EPR, then the near-end speech one signal is given a Boolean value of yes. If not, control passes to block 612 in which LT_EPR is updated. Control then passes the block 614 which the near-end speech one is assigned a Boolean value of no. Control from block 610 and 614 pass through the input decision block 626. Control from block 602 also passes to block 616. In block 616 the echo cancel output energy is computed. Control passes to block 618 in which the echo canceller energy ratio (ECER) is determined as the ratio between the output of the acoustic energy cancellation and noise suppression circuit s(t) to the long-term average for the far-end signal u(t) computed in block 602. Control then passes to block 620 in which ECER is compared to see if it is greater than γ where γ is an empirically determined threshold. If ECER exceeds γ, control then passes to block 622 in which the near-end speech 2 signal is given the Boolean value of yes. If not, control passes to block 624 in which the near-end speech 2 signal is given the Boolean value of no. Control then passes to block 626 which it is determined whether or not the near-end speech 1 and the near-end speech 2 signals both have the Boolean value of yes. If so, near-end speech is detected and the program in block 628 and the program terminates in block 632. If not, then speech is not detected in block 630 and the program terminates in block 632.

Figure 7:
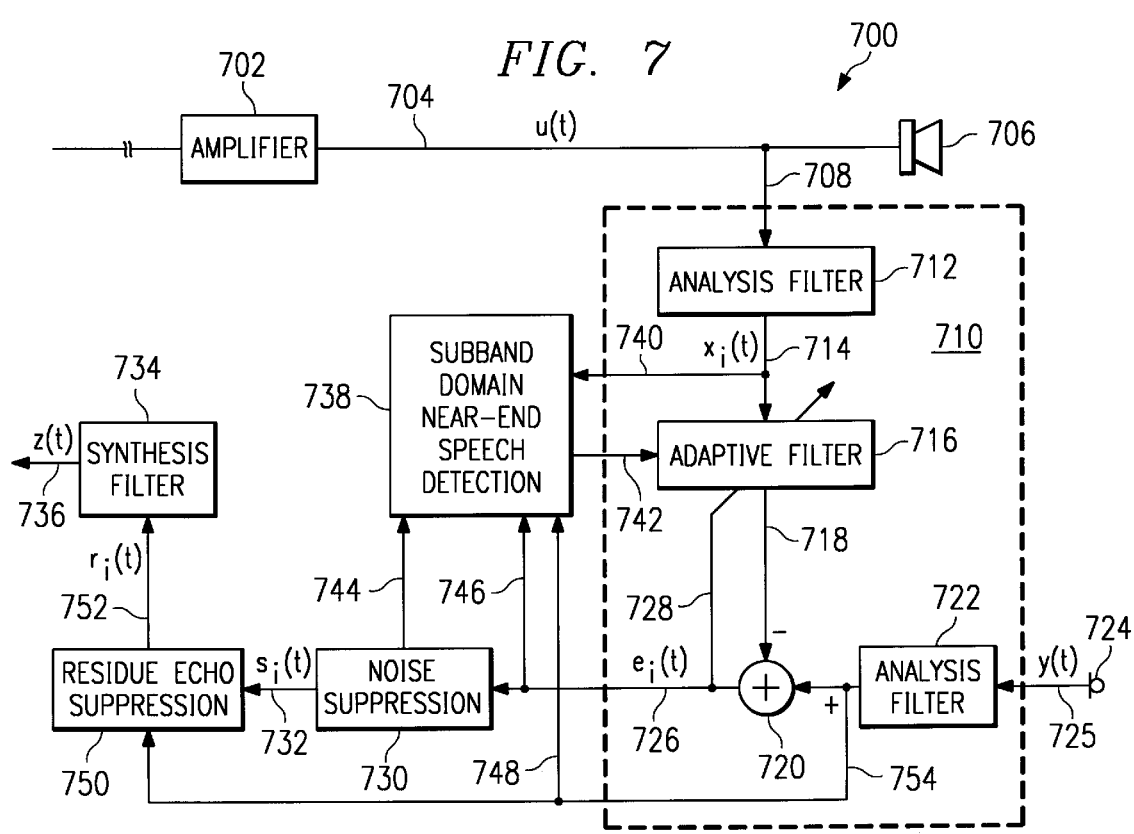
FIG. 7 is a block diagram of an acoustic echo cancellation and noise suppression system having both subband domain near-end speech detection and residue echo suppression.

FIG. 7 shows an acoustic echo cancellation and noise suppression circuit 700 which additionally has residual echo suppression embodied in block 750. Circuit 700 is essentially identical to circuit 500 of FIG. 5 except for the addition of residue echo suppression circuit 750. Like elements have similar reference numerals to those in FIG. 5. In FIG. 7, the subband domain near-end speech detection circuit block 738 is shown, but is not necessary to practice the residue echo suppression. Residue suppression block is connected to receive the signal $s_i(t)$ on line 732 from the output of noise suppression circuit 730. It is also connected to line 748 by line 754 to receive the output of the analysis filter 722 which is the subband domain signal from the microphone 724. The output of the echo suppression circuit 750 is fed via line 752 to the synthesis filter 734 to produce a fullband output z(t) on line 736.

The purpose of the residual echo suppression circuit 750 is to reduce the echo signal, if any, remaining after processing by the acoustic echo canceller circuit 210. For example, if the acoustic echo canceller circuit 210 reduces the echo by 25 dB, it may still be heard. When the environment is noisy, however, complete removal of the residual echo signal is not desirable since it produces clicking effects caused by switching too often between suppression and non-suppression modes. This is caused by the alternator circuit suppressing the noise components over the period when the residual echo signal should be suppressed, which creates abrupt changes in background noise. Therefore, the so-called "comfort noise" is generated to reduce the clicking effects. To avoid suppressing near-end speech, the residual echo suppression is inactive during the presence of near-end speech. The near-end speech detector should be allowed to false alarm by claiming the presence of near-end speech when it is absent to reduce the potential for near-end speech suppression. The residual echo suppression algorithm uses the echo canceller energy ratio (ECER) which was described above, to detect when to suppress the signal. A fixed threshold value is used for detection, similar to that used for the near-end speech detection discussed above. For example, when there is 10 dB cancellation, the ECER value should be less than about 0.3. Therefore, if ECER is less than 0.3, the residual signal is suppressed. It should be noted that the threshold value used here is different from that used in the near-end speech detection circuit.

Figure 8:
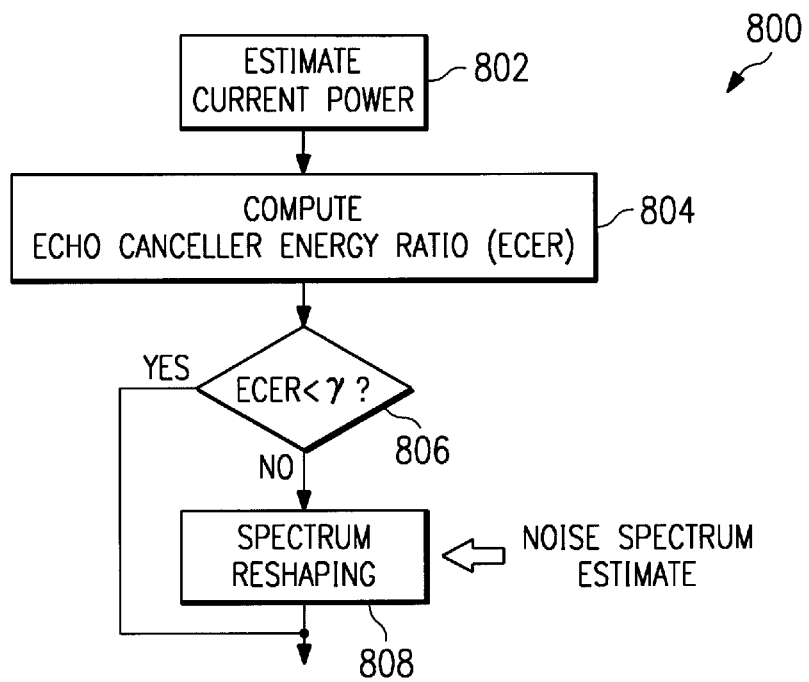
FIG. 8 is flow diagram of the event sequences of the residue echo suppression of the embodiment of FIG. 7.

Residual echo suppression circuit 750 implements the algorithm 800 of FIG. 8. The algorithm starts in block 802 in which the estimate of the current power is made. Control then passes to block 804 in which the echo canceller energy ratio (ECER) as of block 302 is computed. Control passes to block 806 in which it is determined whether or not ECER is less than an empirically determined constant γ. If it is, then the echo is determined to have been suppressed enough and no further action is taken. If it is not, control passes to block 808 in which a spectrum reshaping technique is applied. The spectrum reshaping technique uses the noise spectrum $NS_i$ described above. The purpose of the spectrum reshaping technique is to produce a comfort noise that closely matches the background noise characteristics. The spectrum reshaping technique reshapes the spectrum of the current signal, which contains the audible residual echo signal, based on the noise spectrum estimate. By reshaping the spectrum, the signal sounds similar to the background noise (background noise replaces the residual echo) which results in the clicking effects being almost removed.

Figure 9:
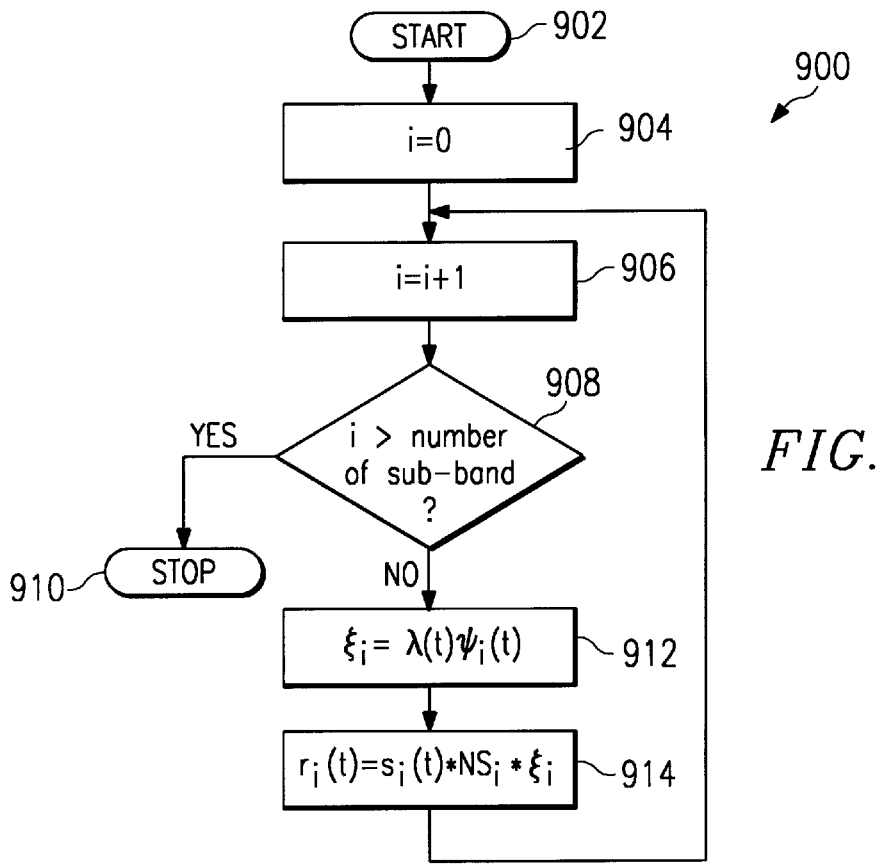
FIG. 9 is flow diagram of the event sequences of the spectrum reshaping of FIG. 8.

The spectrum reshaping technique of block 808 is implemented by the algorithm 900 of FIG. 9. Algorithm 900 starts at block 902 and transfers control to block 904 in which i is set equals to 0 where i represents the number of the frequency bin being processed. The value of i having been initialized, control passes to block 906 in which the value of i is implemented by 1 and control then passes to block 908 in which the decision is made as to whether i is greater than the number of the subband being used in processing; in the present embodiment 8 subbands are used. If i exceeds the number of subbands being processed, control then passes to block 910 where the algorithm stops. If i does not exceed the number of subbands being processed, control passes to block 912 in which the energy $\xi_i$, can be computed using the equation:

$$\xi_i = \lambda/|s_i(t)|^2 \qquad \text{(Equation 3)}$$

where λ is a constant. However, in a preferred embodiment of the invention, equation 3 is replaced with:

$$\xi_i = \lambda(t)\Psi_i(t) \qquad \text{(Equation 4)}$$

where λ(t) is a time-varying constant. Equation 3 represents the scaling value $\xi_i$ based on the instantaneous power of $s_i(t)$ whereas equation 4 represents the scaling value $\xi_i$ based on the average power of $s_i(t)$ which gives a smoother response. In equation 4, $\Psi_i(t)$ is a long-term power estimate for the i-th bin, which can be computed as:

$$\Psi_i(t) = (1-\mu)\Psi_i(t-1) + \mu|s_i(t)|^2 \qquad \text{(Equation 5)}$$

where as before $\mu << 1$.

The time-varying constant λ(t) can be estimated for each frame as:

$$\lambda(t) = \frac{1}{N}\frac{1}{M}\sum_{k=1}^{N}\sum_{j=1}^{M}|s_j(t-k)|^2 \qquad \text{(Equation 6)}$$

where M is the number of bins and N is the total number of data points in a frame. It is also possible to estimate λ(t) in a manner similar to equation 5 or to use a time-invariant constant λ which can be determined empirically.

Control then passes to block 914 in which the output signal $r_i(t)$ is computed by multiplying the signal on line 732 $s_i(t)$ by the noise spectrum estimate and the computed value of $\xi_i$ using equation 7:

$$r_i(t) = s_i(t) \cdot NS_i \cdot \xi_i \qquad \text{(Equation 7)}$$

Control then passes back to block 906 and the process is repeated until the value of M exceeds the number of subbands being processed at which point the algorithm terminates at block 910.

Figure 10:
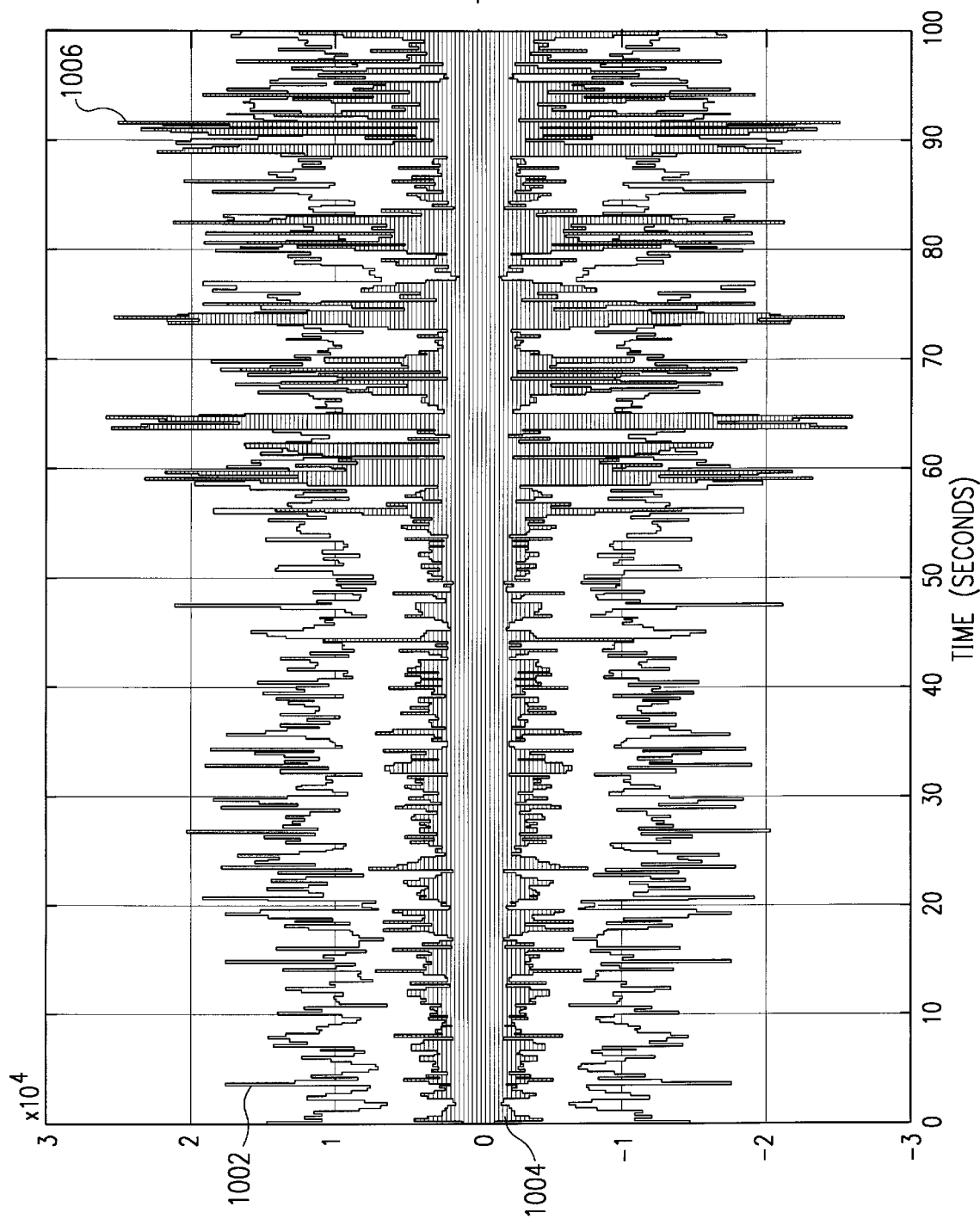
FIG. 10 shows the input and output signals of acoustic echo cancellation and noise suppression system in which residual echo suppression is not used.

FIGS. 10 and 11 illustrate the performance of the system. FIG. 10 shows the input from microphone 224 as signal 1002. For the first period of about 55 seconds, the signal contains the echo signal with highway noise while the remaining period indicates the presence of near-end speech. Signal 1004 shows the dramatic reduction in input noise. Signal 1006 represents the near-end speech. Residual echo suppression was not used in this test.

Figure 11A:
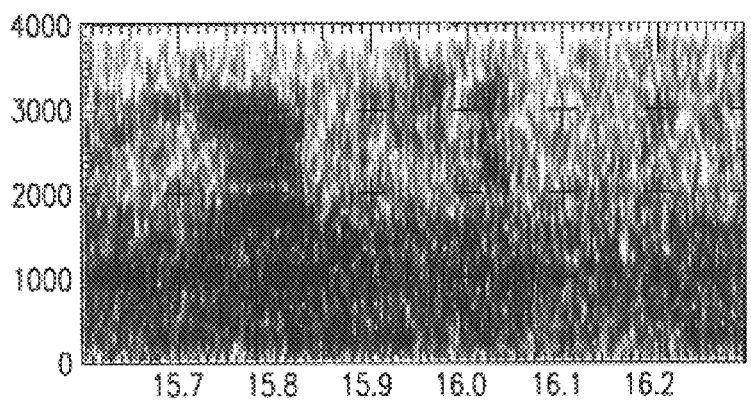
FIG. 11a is a spectrogram of the input signal to the acoustic echo and noise suppression system, y(t).
Figure 11B:
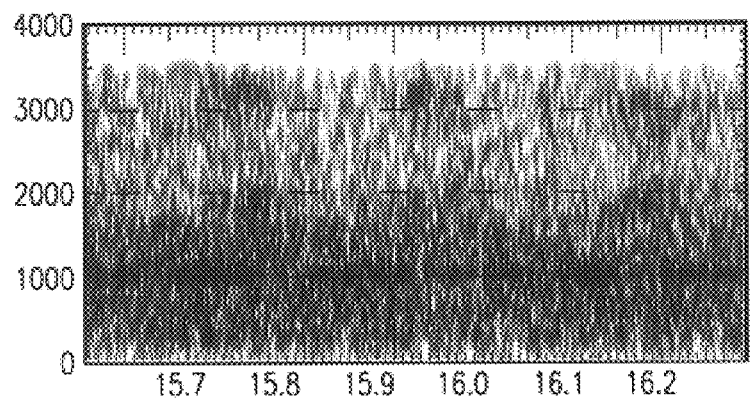
FIG. 11b is a spectrogram of the output of the echo cancellation e(t).
Figure 11C:
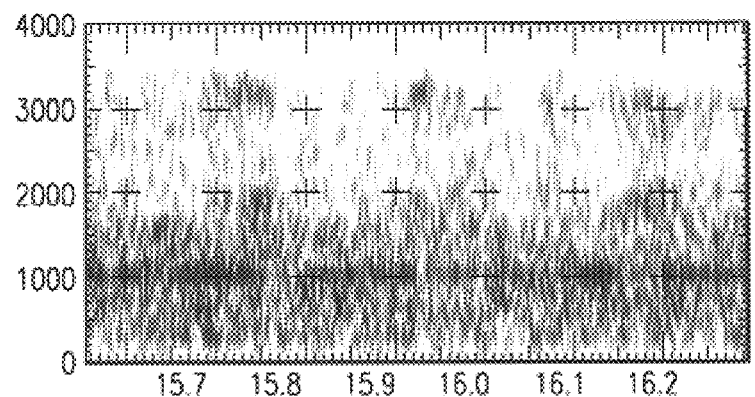
FIG. 11c is a spectrogram of the output of the noise suppression $s_i(t)$.
Figure 11D:
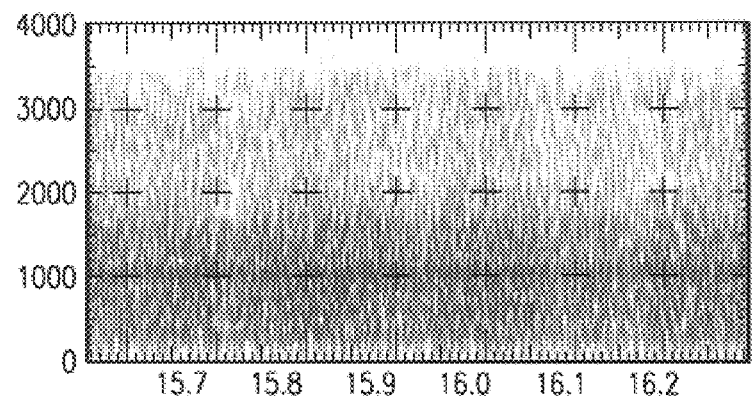
FIG. 11d is a spectrogram of the output $r_i(t)$ of the residual echo suppression using spectrum reshaping.

FIG. 11 depicts the spectrograms of four signals: the input signal of the acoustic echo cancellation and noise suppression system y(t) is of FIG. 11a. The output e(t) of the echo cancellation circuit only is of FIG. 11b. The signal $s_r(t)$ at the output of the noise suppression circuit is of FIG. 11c and the output of the residual echo suppression using spectrum reshaping $r_r(t)$ is of FIG. 11d. Note that the output of the residual echo suppression lacks an indication of the speech characteristics.

It is estimated that using a TMS 320C50 with the program implemented in assembly language that the acoustic echo cancellation program will require 6 MIPS of processing power, the noise suppression 1 MIP of processing power, and the residual echo suppression 1 MIP of processing power. Therefore, a system comprising the acoustic echo cancellation and noise suppression could be performed in 7 MIPS of processing power. When compared with the 20 or 30 MIPS of processing power required for present systems, this represents a two thirds to three quarters reduction in processing power and therefore allows the system to be built at lower cost.

While a particular embodiment of the present invention has been disclosed herein, certain changes and modifications will readily occur to those skilled in the art. For example, although the residual suppression circuit was described in a subband domain system, it is not so limited. Any transformation to represent the frequency domain such as FFT, DFT, or Wavelet Transform can also be used. The circuitry necessary to perform such transformations and inverse transformations back to the frequency domain are well known in the art. All such changes and modifications can be made without departing from the invention as defined by the appended claims.

I claim:

1. A conditioning circuit, comprising:
   microphone-in and speaker-line input terminals for respectively receiving microphone and speaker signals, and a microphone-out output terminal;
   an echo canceller circuit, coupled between the microphone-in and speaker-line input terminals, for producing a subband reduced-echo microphone signal by (i) transforming the microphone signal into a subband microphone signal and the speaker signal into a filtered subband speaker signal, and (ii) subband subtracting the filtered subband speaker signal from the subband microphone signal;
   a subband noise-suppresser circuit, coupled to the echo canceller circuit and receiving said subband reduced-echo microphone signal, for producing a subband reduced-noise, reduced-echo microphone signal by subband noise suppression of the subband reduced-echo microphone signal; and
   a synthesis filter, coupled between the noise-suppresser circuit and the microphone-out terminal, for transforming the subband reduced-noise, reduced-echo microphone signal into a fullband reduced-noise, reduced-echo microphone signal;
   wherein the echo canceller circuit comprises an adaptive filter having changeable filter coefficients responsive to feedback of the subband reduced-echo microphone signal, for transforming the speaker signal into a filtered subband speaker signal; wherein the detector circuit comprises:
   a circuit for determining an echo path energy ratio (EPR) as an energy ratio between the output signal and the input signal and an echo canceller energy ratio (ECER) as an energy ratio between an output of the echo cancellation circuit and the output signal;
   a circuit for comparing EPR to a first predetermined threshold level and ECER to a second predetermined threshold level; and
   a sensing circuit for determining that near-end speech is present when EPR exceeds the first predetermined threshold level and at the same time ECER exceeds the second predetermined threshold level, further comprising a detector circuit responsive to the subband microphone signal, subband reduced-echo microphone signal, and reduced-noise, reduced-echo microphone signal for generating a FREEZE control signal only when the microphone signal contains near-end speech (speech actually voiced near the microphone);
   the adaptive filter being responsive to the FREEZE control signal for disabling the filter coefficients from changing.

2. The conditioning circuit of claim 1, further comprising a subband residue echo cancellation circuit coupling the synthesis filter to the noise-suppresser circuit, which uses the subband microphone signal to reduce any residual echo in the reduced-noise, reduced-echo microphone signal.

3. The conditioning circuit of claim 1 wherein in each subband i the noise-suppresser circuit estimates a current power $p_i(t)$, updates a noise spectrum estimate $NS_i$ computes a noise suppression gain $G_i$, determines an adjusted gain by adjusting for a minimum gain, and scales the subband reduced-echo microphone signal with the adjusted gain.

4. A method of operating a hands-free telephone comprising a loudspeaker coupled to an output signal source for generating a corresponding acoustic signal and a microphone for generating an input signal, the method comprising the steps of:
   reducing the presence of the output signal in the input signal by subband domain acoustic echo cancellation for generating a subband reduced-echo signal; and
   suppressing noise in the subband reduced echo signal without generation an intermediary fullband signal, by subband domain noise suppression for generating a subband reduced-noise reduced echo signal; further comprising a step of reducing any residual echo signal in the subband reduced-echo reduced-noise signal.

5. The method of claim 4 wherein the step of suppressing noise for each subband i comprises estimating a current power $p_i(t)$, updating a noise spectrum estimate $NS_i$, computing a noise suppression gain $G_i$, determining an adjusted gain by adjusting for a minimum gain, and scaling the subband reduced-echo microphone signal with the adjusted gain.

6. An echo cancellation and noise suppression apparatus comprising:
   a loudspeaker responsive to an output signal source for generating a corresponding first acoustic signal;
   a microphone responsive to a second acoustic signal which includes a component of the first acoustic signal for generating a corresponding input signal;
   a subband echo cancellation circuit coupled between the output signal source and the microphone for generating a subband reduced-echo signal by reducing the component of the first acoustic signal in the input signal; and a subband noise suppression circuit responsive to the subband reduced-echo signal for generating a subband reduced-noise reduced-echo signal without generating an intermediary full-band signal by reducing noise in the subband reduced-echo signal; further comprising a subband residue-echo suppression circuit coupled to receive the subband reduced-echo reduced noise signal and the subband signal from the microphone's input signal for reducing any residual echo signal.

7. The apparatus of claim 6 wherein the subband noise suppression circuit is for estimating a current power $\rho_i(t)$, updating a noise spectrum estimate $NS_i$, computing noise suppression gain $G_i$, adjusting for a minimum gain, and scaling the reduced-echo signal with the computed gain.

8. The apparatus of claim 7 wherein $$\rho_i(t)=(1-\mu)\cdot\rho_i(t-1)+\mu|Xi(t)|^2$$

where $\rho_i(t)$ is the estimate of the power spectrum at the $i^{th}$ sub-band $|Xi(t)|^2$ is the current instantaneous power estimate at the $i^{th}$ sub-band and $\mu<<1$.

9. The apparatus of claim 8 wherein $$\text{gain}=\left(1-\frac{NS_i}{k\rho_i}\right)^{1/2}$$

where k is a predetermined value to reduce the fluctuation of gain due to the power spectrum estimate and $NS_i$ is the noise spectrum estimate for the $i^{th}$ sub-band.

10. The method of claim 6 wherein EPR and ECER are determined based on frequency components beyond 500 Hz.

11. The method of claim 5 wherein $$\rho_i(t)=(1-\mu)\cdot\rho_i(t-1)+\mu|Xi(t)|^2$$

where $\rho_i(t)$ is the estimate of the power spectrum at the $i^{th}$ sub-band $|Xi(t)|^2$ is the current instantaneous power estimate at the $i^{th}$ sub-band and $\mu<<1$.

12. The method of claim 11 wherein $$\text{gain}=\left(1-\frac{NS_i}{k\rho_i}\right)^{1/2}$$

where k is a predetermined value to reduce the fluctuation of gain due to the power spectrum estimate and $NS_i$ is the noise spectrum estimate for the $i^{th}$ sub-band.

13. An echo cancellation and noise suppression apparatus comprising:

a loudspeaker responsive to an output signal source for generating a corresponding first acoustic signal;

a microphone responsive to a second acoustic signal which includes a component of the first acoustic signal for generating a corresponding input signal;

a subband echo cancellation circuit coupled between the output signal source and the microphone for generating a subband reduced-echo signal by reducing the component of the first acoustic signal in the input signal; and a subband noise suppression circuit responsive to the subband reduced-echo signal for generating a subband reduced-noise reduced-echo signal without generating an intermediary full-band signal by reducing noise in the subband reduced-echo signal further comprising a near-end speech detector comprising:

echo detector for determining an echo path energy ratio (EPR) as an energy ratio between the output signal and the input signal;

an echo canceller output detector for determining an echo canceller energy ratio (ECER) as an energy ratio between an output of the echo cancellation circuit and the output signal;

a comparator circuit for simultaneously comparing (i) EPR to a first predetermined threshold level and (ii) ECER to a second predetermined threshold level; and a detector circuit responsive to the comparator circuit for indicating that near-end speech is present when EPR and ECER simultaneously respectively exceed the first and second predetermined threshold levels.

14. A conditioning circuit, comprising:

microphone-in and speaker-line input terminals for respectively receiving microphone and speaker signals, and a microphone-out output terminal;

an echo canceller circuit, coupled between the microphone-in and speaker-line input terminals, and comprising an adaptive filter having changeable filter coefficients responsive to feedback of the subband reduced-echo microphone signal, for producing a subband reduced-echo microphone signal by (i) transforming the microphone signal into a subband microphone signal and the speaker signal into a filtered subband speaker signal, and (ii) subband subtracting the filtered subband speaker signal from the subband microphone signal;

a noise-suppresser circuit, coupled to the echo canceller circuit, for producing a subband reduced-noise, reduced-echo microphone signal by subband noise suppression of the subband reduced-echo microphone signal;

a detector circuit comprising a circuit for determining an echo path energy ratio (EPR) as an energy ratio between the output signal and the input signal and an echo canceller energy ratio (ECER) as an energy ratio between an output of the echo cancellation circuit and the output signal; a circuit for comparing EPR to a first predetermined threshold level and ECER to a second predetermined threshold level; and a sensing circuit for determining that near-end speech is present when EPR exceeds the first predetermined threshold level and at the same time ECER exceeds the second predetermined threshold level, and responsive to the subband microphone signal, subband reduced- echo microphone signal, and reduced-noise, reduced-echo microphone signal for generating a FREEZE control signal only when the microphone signal contains near-end speech (speech actually voiced near the microphone);

the adaptive filter being responsive to the FREEZE control signal for disabling the filter coefficients from changing; and a synthesis filter, coupled between the noise-suppresser circuit and the microphone-out terminal, for transforming the subband reduced-noise, reduced-echo microphone signal into a fullband reduced-noise, reduced-echo microphone signal.

15. The conditioning circuit of claim 14 further comprising a subband residue echo cancellation circuit coupling the synthesis filter to the noise-suppresser circuit, which uses the subband microphone signal to reduce any residual echo in the reduced-noise, reduced-echo microphone signal.

16. The conditioning circuit of claim 14 wherein in each subband in the noise-suppresser circuit estimates a current power $\rho_i(t)$, updates a noise spectrum estimate $NS_i$, computes a noise suppression gain $G_i$, determines an adjusted gain by adjusting for a minimum gain, and scales the subband reduced-echo microphone signal with the adjusted gain.

17. The conditioning circuit of claim 14 further comprising a loudspeaker and a microphone respectively coupled to the speaker-line terminal and the microphone-in terminal.

18. A method of operating a hands-free telephone comprising a loudspeaker coupled to an output signal source for generating a corresponding acoustic signal and a microphone for generating an input signal, the method comprising the steps of:

reducing the presence of the output signal in the input signal by subband domain acoustic echo cancellation for generating a subband reduced-echo signal; and suppressing noise in the subband reduced echo signal by subband domain noise suppression for generating a subband reduced-noise reduced echo signal, and reducing any residual echo signal in the subband reduced-echo reduced-noise signal; wherein the step of suppressing noise for each subband i comprises estimating a current power $\rho_i(t)$, updating a noise spectrum estimate $NS_i$, computing a noise suppression gain $G_i$, determining an adjusted gain by adjusting for a minimum gain, and scaling the subband reduced-echo microphone signal with the adjusted gain.

19. An echo cancellation and noise suppression apparatus comprising:

a loudspeaker responsive to an output signal source for generating a corresponding first acoustic signal;

a microphone responsive to a second acoustic signal which includes a component of the first acoustic signal for generating a corresponding input signal;

a subband echo cancellation circuit coupled between the output signal source and the microphone for generating a subband reduced-echo signal by reducing the component of the first acoustic signal in the input signal;

a subband noise suppression circuit responsive to the subband reduced-echo signal for generating a subband reduced-noise reduced-echo signal by reducing noise in the subband reduced-echo signal; and a subband residue-echo suppression circuit coupled to receive the subband reduced-echo reduced noise signal and the subband signal from the microphone input signal for reducing any residual echo signal; wherein the subband noise suppression circuit is for estimating a current power $\rho_i(t)$, updating a noise spectrum estimate $NS_i$, computing noise suppression gain $G_i$, adjusting for a minimum gain, and scaling the reduced-echo signal with the computed gain.

20. The apparatus of claim 19 wherein the loudspeaker and the microphone comprise a hands-free telephone.

21. The apparatus of claim 19 further comprising a near-end speech detector comprising:

an echo energy detector for determining an echo path energy ratio (EPR) as an energy ratio between the output signal and the input signal;

an echo canceller output detector for determining an echo canceller energy ratio (ECER) as an energy ratio between an output of the echo cancellation circuit and the output signal;

a comparator circuit for simultaneously comparing (i) EPR to a first predetermined threshold level and (ii) ECER to a second predetermined threshold level; and a detector circuit responsive to the comparator circuit for indicating that near-end speech is present when EPR and ECER simultaneously respectively exceed the first and second predetermined threshold levels.

* * * * *